United States Patent
Xu et al.

(10) Patent No.: US 12,355,541 B2
(45) Date of Patent: Jul. 8, 2025

(54) INFORMATION INDICATION METHOD, NODE, AND STORAGE MEDIUM

(71) Applicant: ZTE Corporation, Guangdong (CN)

(72) Inventors: Wanfu Xu, Guangdong (CN); Chuangxin Jiang, Guangdong (CN); Feng Xie, Guangdong (CN); Jie Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 18/020,174

(22) PCT Filed: Aug. 6, 2021

(86) PCT No.: PCT/CN2021/111286
§ 371 (c)(1),
(2) Date: Feb. 7, 2023

(87) PCT Pub. No.: WO2022/028601
PCT Pub. Date: Feb. 10, 2022

(65) Prior Publication Data
US 2023/0318689 A1    Oct. 5, 2023

(30) Foreign Application Priority Data
Aug. 7, 2020 (CN) .......... 202010790934.5

(51) Int. Cl.
*H04B 7/06*  (2006.01)
*H04L 5/00*  (2006.01)
*H04W 72/231*  (2023.01)

(52) U.S. Cl.
CPC ....... *H04B 7/06968* (2023.05); *H04L 5/0053* (2013.01); *H04L 5/0094* (2013.01); *H04W 72/231* (2023.01); *H04B 7/0626* (2013.01)

(58) Field of Classification Search
CPC . H04B 7/0626; H04B 7/06968; H04L 5/0094; H04L 5/0053; H04W 72/231
(Continued)

(56) References Cited

U.S. PATENT DOCUMENTS

| 10,834,728 B2 | 11/2020 | Li et al. |
| 2019/0181925 A1 | 6/2019 | Kang et al. |

(Continued)

FOREIGN PATENT DOCUMENTS

| CN | 107888266 A | 4/2018 | |
| CN | 111934838 A | 11/2020 | |
| WO | WO-2019158080 A1 * | 8/2019 | ........... H04B 7/0626 |

OTHER PUBLICATIONS

European Search Report issued in EP Patent Application No. 21854042.5, dated on Jan. 19, 2024, 8 pages.

(Continued)

*Primary Examiner* — Peter G Solinsky
(74) *Attorney, Agent, or Firm* — Perkins Coie LLP

(57) ABSTRACT

Disclosed are an information indication method, a node and a storage medium. The information indication method includes: by a first communication node, generating a control command, and then transmitting the control command to a second communication node, wherein the control command carries control information or carries control information and pre-compensation parameter information. The pre-compensation parameter information is used to indicate a first parameter. The control information is used to indicate whether the first communication node performs pre-compensation for the first parameter of at least one of a PDCCH, a PDSCH and a CSI-RS according to a configured QCL relationship.

20 Claims, 5 Drawing Sheets

(58) Field of Classification Search
USPC .......................................................... 370/329
See application file for complete search history.

(56) References Cited

U.S. PATENT DOCUMENTS

| | | |
|---|---|---|
| 2019/0260532 A1 | 8/2019 | Manolakos et al. |
| 2020/0196306 A1 | 6/2020 | Si et al. |
| 2021/0050972 A1* | 2/2021 | Zheng .................... H04L 5/0048 |
| 2022/0131664 A1* | 4/2022 | Nam ...................... H04L 5/0032 |

OTHER PUBLICATIONS

International Search Report and Written Opinion for International Application No. PCT/CN2021/111286, mailed on Nov. 4, 2021. 14 pages with translation.
Samsung, "Summary of email Discussion for Rel.17 enhancements on MIMO for NR," 3GPP TSG RAN Meeting #86, RP-192435, Sitges, Spain, Dec. 9-12, 2019, 31 pages.

* cited by examiner

|  | Serving Cell ID | CORESET ID | Oct 1 |
|---|---|---|---|
| CORESET ID | TCI State ID | | Oct 2 |

FIG. 1

| CORESET ID | Serving Cell ID | | | CORESET ID | | | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\cdot 8+7}$ | $T_{(N-2)\cdot 8+6}$ | $T_{(N-2)\cdot 8+5}$ | $T_{(N-2)\cdot 8+4}$ | $T_{(N-2)\cdot 8+3}$ | $T_{(N-2)\cdot 8+2}$ | $T_{(N-2)\cdot 8+1}$ | $T_{(N-2)\cdot 8}$ | Oct N |

FIG. 2

| R | Serving Cell ID | BWP ID | Oct 1 |
|---|---|---|---|
| $C_0$ | TCI State $ID_{0,1}$ | | Oct 2 |
| R | TCI State $ID_{0,2}$ | | Oct 3 (Optional) |
| ... | | | |
| $C_0$ | TCI State $ID_{0,1}$ | | Oct M-1 |
| R | TCI State $ID_{0,2}$ | | Oct M (Optional) |

FIG. 3

INFORMATION INDICATION METHOD, NODE, AND STORAGE MEDIUM

CROSS-REFERENCE TO RELATED APPLICATIONS

This application is a U.S. National Stage Application of PCT Application Serial No. PCT/CN2021/111286, filed on Aug. 6, 2021, which claims priority to Chinese patent application No. 202010790934.5, filed with the Chinese Patent Office on Aug. 7, 2020, the entire contents of each of which are incorporated herein by reference in their entireties.

TECHNICAL FIELD

The present disclosure relates to the technical field of wireless communication, and in particular to an information indication method, a node and a storage medium.

BACKGROUND

In the field of wireless communication, in order to ensure that the terminal device can better receive and demodulate signals, the terminal device usually needs to obtain the quasi co-location (QCL) relationship of antenna ports, so as to demodulate data according to the QCL relationship. In the existing long term evolution (LTE) and new radio (NR) protocols, different types of reference signals have been stipulated. The QCL reference type is acquired in the following ways: for example, being configured through radio resource control (RRC), e.g., channel state information-reference signals (CSI-RS)/tracking reference signals (TRS); being configured through RRC and activated by a media access control-control element (MAC-CE), e.g., indicating activated and deactivated periodic CSI-RS/TRS by the MAC-CE, or indicating demodulation reference signals (DMRSs) of activated and deactivated physical downlink control channels (PDCCHs); being configured through RRC, activated by the MAC-CE and indicated by downlink control information (DCI), e.g., aperiodic CSI-RS/TRS, or DMRS of physical downlink shared channels (PDSCH).

The existing MAC-CE are classified into two categories, PDCCHs and PDSCHs. By taking the NR R16 standard as an example, the contents of MAC-CEs are shown in FIGS. 1, 2 and 3. However, the terminal device performs demodulation and optimization according to the QCL relationship by default. The terminal device defaults that the DMRS of PDCCH and PDSCH have a QCL relationship with the synchronization signal (SS)/physical broadcast channel (PBCH) for the initial access, until a further command from the network device is received. If the terminal device performs certain operations (e.g., pre-compensation) while the terminal device cannot know it, it is likely that the network device and the terminal device perform the QCL operation simultaneously, resulting in reduced demodulation performance or demodulation error.

SUMMARY

Some embodiments of the present disclosure provide an information indication method, a node and a storage medium, to realize that a second communication node performs subsequent corresponding operations according to the specific indication in the received control information.

Some embodiments of the present disclosure provide an information indication method, including the following of:

generating a control command by a first communication node; and transmitting, by the first communication node, the control command to a second communication node;

wherein the control command carries control information, or the control command carries control information and pre-compensation parameter information. The control information is used to indicate whether the first communication node performs pre-compensation for a first parameter of at least one of a PDCCH, a PDSCH and a CSI-RS according to a configured QCL relationship; and, the pre-compensation parameter information is used to indicate the first parameter.

Some embodiments of the present disclosure provide an information indication method, including the following of:

receiving a control command by a second communication node; and enabling or disabling, by the second communication node, a first parameter compensation operation between a first channel and a first signal according to the control command;

wherein the control command carries control information, or the control command carries control information and pre-compensation parameter information; the control information is used to indicate whether the first communication node performs pre-compensation for a first parameter of at least one of the PDCCH, the PDSCH and the CSI-RS according to a configured QCL relationship, the pre-compensation parameter information is used to indicate the first parameter.

Some embodiments of the present disclosure provide an information indication apparatus, including:

a generation module configured to generate a control command; and a transmitting module configured to transmit the control command to a second communication node, wherein the control command carries control information, or the control command carries control information and pre-compensation parameter information; the control information is used to indicate whether the first communication node performs pre-compensation for the first parameter of at least one of the PDCCH, the PDSCH and the CSI-RS according to a configured QCL relationship, the pre-compensation parameter information is used to indicate the first parameter.

Some embodiments of the present disclosure provide an information indication apparatus, including:

a receiving module configured to receive a control command, and a processing module configured to enable or disable a first parameter compensation operation between a first channel and a first signal according to the control command;

wherein the control command carries control information, or the control command carries control information and pre-compensation parameter information, the control information is used to indicate whether the first communication node performs pre-compensation for the first parameter of at least one of the PDCCH and/or the PDSCH according to a configured QCL relationship, the pre-compensation parameter information is used to indicate the first parameter.

Some embodiments of the present disclosure provide a node, including a processor, programs being executed by the processor to implement the information indication method according to the embodiments of the present disclosure.

Some embodiments of the present application provide a readable and writable storage medium for computer storage. The storage medium stores one or more programs that can be executed by one or more processors to implement the information indication method according to the embodiments of the present application.

Some embodiments of the present disclosure provide an information indication method, a node and a storage medium. A first communication node generates a control command, and then transmits the control command to a second communication node, wherein the control command carries control information or carries control information and pre-compensation parameter information. The pre-compensation parameter information is used to indicate a first parameter, and the control information is used to indicate whether the first communication node performs pre-compensation for the first parameter of at least one of the PDCCH, the PDSCH and the CSI-RS according to the configured QCL relationship. Thus, the second communication node can determine, according to the content indicated in the control command, whether to perform subsequent compensation or other operations.

BRIEF DESCRIPTION OF DRAWINGS

FIG. 1 is a schematic diagram of indicating a specific User Equipment (UE) PDCCH MAC CE by a Transmission Configuration Indication (TCI) state according to an embodiment of the present disclosure:

FIG. 2 is a schematic diagram of indicating a specific UE PDCCH MAC CE by an active/inactive TCI state according to an embodiment of the present disclosure;

FIG. 3 is a schematic diagram of indicating a specific UE PDCCH MAC CE by an enhanced active/inactive TCI state according to an embodiment of the present disclosure;

DETAILED DESCRIPTION

The embodiments of the present application will be described below in detail with reference to the accompanying drawings. It is to be noted that the embodiments in the present application and the features in the embodiments can be arbitrarily combined with each other if not conflicted.

In addition, in the embodiments of the present application, the word "optionally" or "exemplarily" is used to represent examples, illustrations or explanations. Any embodiment or design scheme described as "optionally" or "exemplarily" in the embodiments of the present application should not be interpreted as being more preferable or advantageous than other embodiments or design schemes. Specifically, the use of words such as "optionally" or "exemplarily" is intended to present related concepts in a specific manner.

Figure 4:
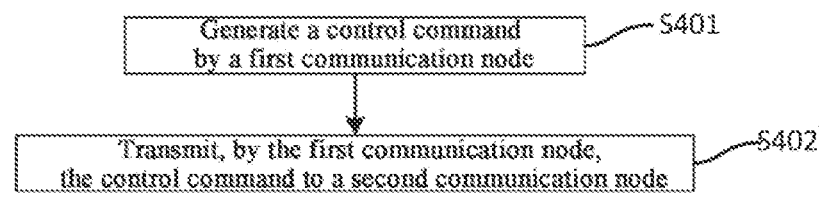
FIG. 4 is a flowchart of an information indication method according to an embodiment of the present disclosure.

FIG. 4 shows a flowchart of an information indication method according to an embodiment of the present application. As shown in FIG. 4, the method may include the following.

At S401, a first communication node generates a control command.

Exemplarily, the first communication mode may be a network device on the network side, e.g., a base station, etc. The control command may carry control information, or the control command may carry control information and pre-compensation parameter information, wherein the control information may be used to indicate whether the first communication node performs pre-compensation for a first parameter of at least one of a PDCCH, a PDSCH and a CSI-RS according to a configured QCL relationship, and the pre-compensation parameter information is used to indicate the first parameter.

Optionally, the control command may include at least one of a medium access control control element (MAC CE), a PDCCH DCI and an RRC, and the first parameter may include at least one of a Doppler shift, an average delay, a Doppler spread, a delay spread and a spatial Rx parameter.

Optionally, in the embodiment of the present application, the QCL relationship may be configured through an RRC message. When the control command is an RRC message, that is, when it is indicated through an RRC message whether the first communication node performs pre-compensation for the first parameter, the indication is realized by one RRC message. That is, the RRC message carries the configured QCL relationship, or may also indicate whether the first communication node performs pre-compensation for the first parameter.

At S402, the first communication mode transmits the control command to a second communication node.

At this S402, the second communication node may be a user equipment, a terminal or other communication nodes.

In the embodiment of the present application, after the first communication node generates a control command, the first communication node transmits the control command to a second communication node, wherein the control command carries control information or carries control information and pre-compensation parameter information. The pre-compensation parameter information is used to indicate a first parameter, and the control information is used to indicate whether the first communication node performs pre-compensation for the first parameter of at least one of a PDCCH, a PDSCH and a CSI-RS according to a configured QCL relationship. Thus, the second communication node can determine, according to the content indicated in the control command, whether to perform subsequent compensation or other operations.

In an example, in a case where the control command includes an MAC CE, the MAC CE may be used to indicate whether the first communication node performs pre-compensation for the first parameter, and indicate the second communication node to enable or disable a first parameter compensation operation between a first channel and a first signal. The MAC CE may be identified by an MAC subheader of a logical channel identifier.

In an example, the MAC CE may include one or more 1-bit first parameter pre-compensation indication domains, the first parameter pre-compensation indication domain is used to indicate that the first communication node does not pre-compensate for the first parameter and indicate the second communication node to enable the first parameter compensation operation between the first channel and the first signal. Or the first parameter pre-compensation indication domain is used to indicate that the first communication node performs pre-compensation for the first parameter and indicate the second communication node to disable the first parameter compensation operation between the first channel and the first signal.

For example, a first parameter pre-compensation indication domain of "1" may be used to indicate that the first communication node does not pre-compensate for the first parameter and indicate the second communication node to enable the first parameter compensation operation between the first channel and the first signal. The first parameter pre-compensation indication domain of "0" may be used to indicate that the first communication node performs pre-compensation for the first parameter and indicate the second communication node to disable the first parameter compensation operation between the first channel and the first signal. For example, a first parameter pre-compensation indication domain of "0" may be used to indicate that the first communication node does not pre-compensate for the first parameter and indicate the second communication node to enable the first parameter compensation operation between the first channel and the first signal. The first parameter pre-compensation indication domain of "1" may be used to indicate that the first communication node performs QCL pre-compensation and indicate the second communication node to disable the first parameter compensation operation between the first channel and the first signal.

In an example, in a case where the control information includes PDCCH DCI, the PDCCH DCI is a 1-bit first parameter pre-compensation indication field. The first parameter pre-compensation indication field is used to indicate that the first communication node does not pre-compensate for the first parameter and indicate the second communication node to enable the first parameter compensation operation between the first channel and the first signal Or the first parameter pre-compensation indication field is used to indicate that the first communication node performs pre-compensation for the first parameter and indicate the second communication node to disable the first parameter compensation operation between the first channel and the first signal.

For example, a first parameter pre-compensation indication field of "1" may be used to indicate that the first communication node does not pre-compensate for the first parameter and indicate the second communication node to enable the first parameter compensation operation between the first channel and the first signal. The first parameter pre-compensation indication field of "0" may be used to indicate that the first communication node performs pre-compensation for the first parameter and indicate the second communication node to disable the first parameter compensation operation between the first channel and the first signal. Or the first parameter pre-compensation indication field of "0" may be used to indicate that the first communication node does not pre-compensate for the first parameter and indicate the second communication node to enable the first parameter compensation operation between the first channel and the first signal. The first parameter pre-compensation indication field of "1" may be used to indicate that the first communication node performs pre-compensation for the first parameter and indicate the second communication node to disable the first parameter compensation operation between the first channel and the first signal.

Optionally, it is also possible to design the first parameter pre-compensation indication domain and the first parameter pre-compensation indication field to be "T" or "F" or other forms for different indications, and this will not be limited in the embodiments of the present application.

In an example, in a case where the control information includes an RRC message, the RRC message may be used to indicate that the first communication node does not pre-compensate for the first parameter and indicate the second communication node to enable the first parameter compensation operation between the first channel and the first signal. Or the RRC message is used to indicate that the first communication node performs pre-compensation for the first parameter and indicate the second communication node to disable the first parameter compensation operation between the first channel and the first signal.

For example, the RRC message carrying "1" may be used to indicate that the first communication node does not pre-compensate for the first parameter and indicate the second communication node to enable the first parameter compensation operation between the first channel and the first signal. The RRC message carrying "0" may be used to indicate that the first communication node performs pre-compensation for the first parameter and indicate the second communication node to disable the first parameter compensation operation between the first channel and the first signal. Or, the RRC message carrying "0" may be used to indicate that the first communication node does not pre-compensate for the first parameter and indicate the second communication node to enable the first parameter compensation operation between the first channel and the first signal. The RRC message carrying "1" may be used to indicate that the first communication node performs pre-compensation for the first parameter and indicate the second communication node to disable the first parameter compensation operation between the first channel and the first signal.

Similarly, the RRC message may also carry different forms of information such as "T" and "F" to indicate whether the first communication node performs pre-compensation for the first parameter.

In an example, the first channel may include a PDCCH and/or a PDSCH; and the first signal includes an SS/PBCH and/or a TRS.

Optionally, the 1 bit for indicating the second communication node to disable or enable the first parameter relationship between the first channel and the first signal may be a separate 1-bit command field, or may be a reused DCI field.

In an example, an embodiment of the present application further provides several possible forms of the MAC CE, as described in the following.

Figure 5:
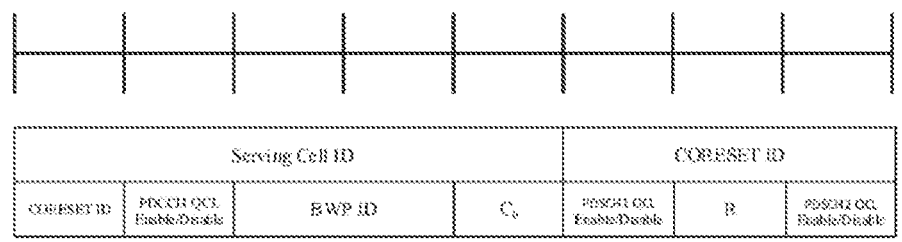
FIG. 5 is a schematic diagram of an MAC CE content according to an embodiment of the present disclosure.

With regard to the first form, as shown FIG. 5, each role has 8 bits, the Serving Cell ID field indicates the identifier (ID) of the serving cell to which the MAC CE is applied, and this field has a length of 5 bits. If the indicated serving cell is configured as a part of the Component Carrier (CC) list specified in the TS 38.331 protocol, the MAC CE is applied to all CCs in the CC list.

The CORESET ID field indicates the control resource set identified by the Control Resource Set ID specified in the TS 38.331 protocol. If the value of this field is 0, the field refers to the control resource set configured by the control Resource Set Zero specified in the TS 38.331 protocol, this field has a length of 4 bits.

The PDCCH QCL Enable/Disable field indicates the second communication node to enable/disable the QCL relationship between the first channel and the first signal.

The Bandwidth Part identification (BWP ID) field indicates the Downlink Bandwidth Part (DL BWP), the MAC CE may be applied to the DL BWP, and the BWP ID field has a length of 2 bits. If the MAC CE is applied to the CC list, this field will be ignored.

The $C_0$ field indicates whether the PDSCH2 QCL Enable/Disable field is included. If this field is "1", it may indicate that the PDSCH2 QCL Enable/Disable field is included. If this field is "0", it may indicate that the PDSCH2 QCL Enable/Disable field is not included.

The PDSCH1 QCL Enable/Disable field indicates that the first parameter compensation operation between the first channel and the first signal of the first TRP in a multi transmission reception point (Multi-TRP).

The PDSCH2 QCL Enable/Disable field indicates the first parameter compensation operation between the first channel and the first signal of the second TRP in the Multi-TRP.

R represents the reserved bit and may be set as "0".

Figure 6:
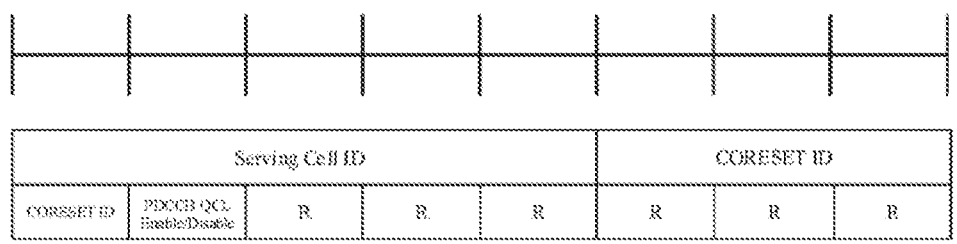
FIG. 6 is a schematic diagram of an MAC CE content according to an embodiment of the present disclosure.

With regard to the second form, as shown in FIG. 6, the Serving Cell ID field may indicate the ID of the serving cell to which the MAC CE is applied, and has a length of 5 bits. If the indicated serving cell is configured as a part of the CC list specified in the TS 38.331 protocol, the MAC CE is applied to all CCs in the CC list.

The CORESET ID field indicates the control resource set identified by the Control Resource Set ID specified in the TS 38.331 protocol. If the value of this field is 0, this field refers to the control resource set configured by the control Resource Set Zero specified in the TS 38.331 protocol, and has a length of 4 bits.

The PDSCH QCL Enable/Disable field indicates the second communication node to enable/disable the first parameter compensation operation between the first channel and the first signal.

R represents the reserved bit, and may be set as "0".

Figure 7:
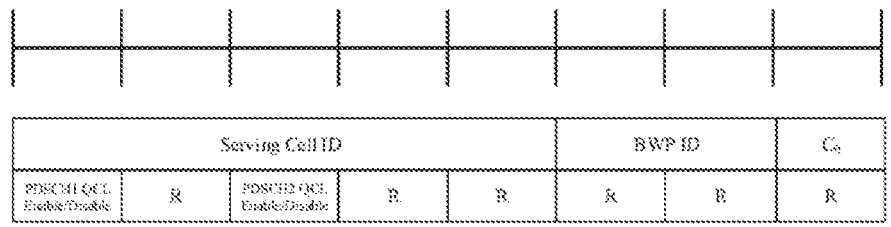
FIG. 7 is a schematic diagram of an MAC CE content according to an embodiment of the present disclosure.

With regard to the third form, as shown in FIG. 7, the Serving Cell ID field may indicate the ID of the serving cell to which the MAC CE is applied, and this field has a length of 5 bits. If the indicated serving cell is configured as a part of the CC list specified in the TS 38.331 protocol, the MAC CE is applied to all CCs in the CC list.

The BWP ID field indicates the DL BWP, the MAC CE is applied to the DL BWP, and the BWP ID field has a length of 2 bits. If the MAC CE is applied to the CC list, this field will be ignored.

The $C_0$ field indicates whether the PDSCH2 QCL Enable/Disable field is included. If this field is "1", it may indicate that the PDSCH2 QCL Enable/Disable field is included. If this field is "0", it may indicate that the PDSCH2 QCL Enable/Disable field is not included.

The PDSCH1 QCL Enable/Disable field indicates the first parameter compensation operation between the first channel and the first signal of the first TRP in the Multi-TRP.

The PDSCH2 QCL Enable/Disable field indicates the first parameter compensation operation between the first channel and the first signal of the second TRP in the Multi-TRP.

R represents the reserved bit and may be set as "0".

Figure 8:
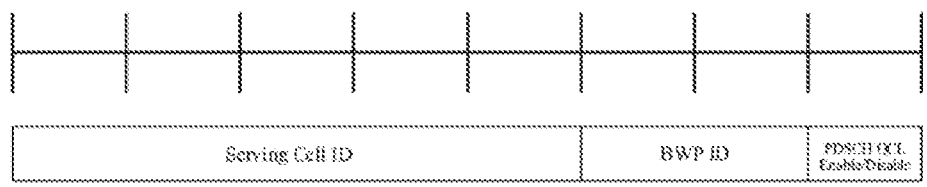
FIG. 8 is a schematic diagram of an MAC CE content according to an embodiment of the present disclosure.

With regard to the fourth form, as shown in FIG. 8, the Serving Cell ID field indicates the ID of the serving cell to which the MAC CE is applied, and has a length of 5 bits. If the indicated serving cell is configured as a part of the CC list specified in the TS 38.331 protocol, the MAC CE is applied to all CCs in the CC list.

The BWP ID field indicates the DL BWP, the MAC CE is applied to the DL BWP, and the BWP ID field has a length of 2 bits. If the MAC CE is applied to the CC list, this field will be ignored.

The PDSCH QCL Enable/Disable field indicates the first parameter compensation operation between all first channels and first signals in the BWP of the second communication node.

R represents the reserved bit and may be set as "0".

Figure 9:
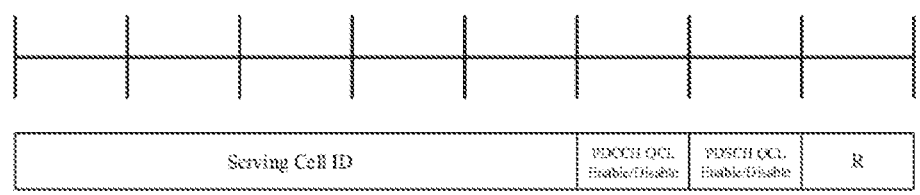
FIG. 9 is a schematic diagram of an MAC CE content according to an embodiment of the present disclosure.

With regard to the fifth form, as shown in FIG. 9, the Serving Cell ID field indicates the ID of the serving cell to which the MAC CE is applied, and this field has a length of 5 bits. If the indicated serving cell is configured as a part of the CC list specified in the TS 38.331 protocol, the MAC CE is applied to all CCs in the CC list.

The PDSCH QCL Enable/Disable field indicates the first parameter compensation operation between all first channels and first signals of the second communication node.

The PDSCH QCL Enable/Disable field indicates the first parameter compensation operation between all first channels and first signals of the second communication node.

R represents the reserved bit and may be set as "0".

Figure 10:
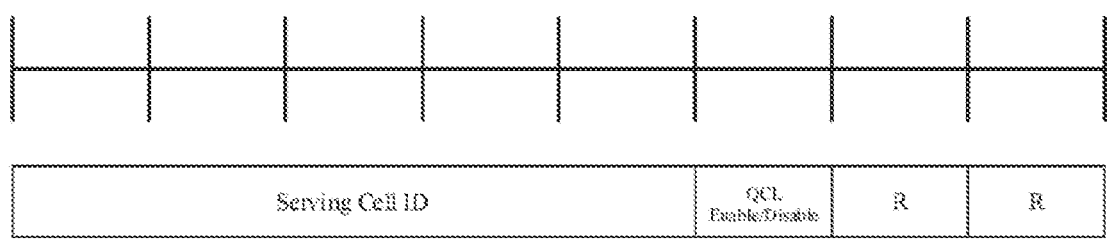
FIG. 10 is a schematic diagram of an MAC CE content according to an embodiment of the present disclosure.

With regard to the sixth form, as shown in FIG. 10, the Serving Cell ID field indicates the ID of the serving cell to which the MAC CE is applied, and this field has a length of 5 bits. If the indicated serving cell is configured as a part of the CC list specified in the TS 38.331 protocol, the MAC CE is applied to all CCs in the CC list.

The QCL Enable/Disable field indicates the first parameter compensation operation between all first channels and first signals of the second communication node.

R represents the reserved bit and may be set as "0".

In an example, the PDCCH DCI domain included in the control information may be named PDSCH QCL Enable/Disable, and may be present in the DCI format 0_1 or DCI format1_1 or DCI format2_1. If this field is "1", the first parameter compensation operation between the first channel and the first signal is enabled, that is, one or more parameters of the average delay, the Doppler shift, the delay spread, the Doppler spread and the spatial Rx parameter are used for the PDSCH according to the configuration. If this field is "0", any first parameter compensation operation will not be enabled for the PDSCH. Or, if this field is "0", the QCL relationship between the first channel and the first signal is enabled, that is, one or more parameters of the average delay, the Doppler shift, the delay spread, the Doppler spread and the spatial Rx parameter are used for the PDSCH according to the configuration. If this field is "1", any first parameter compensation operation will not be enabled for the PDSCH.

Figure 11:
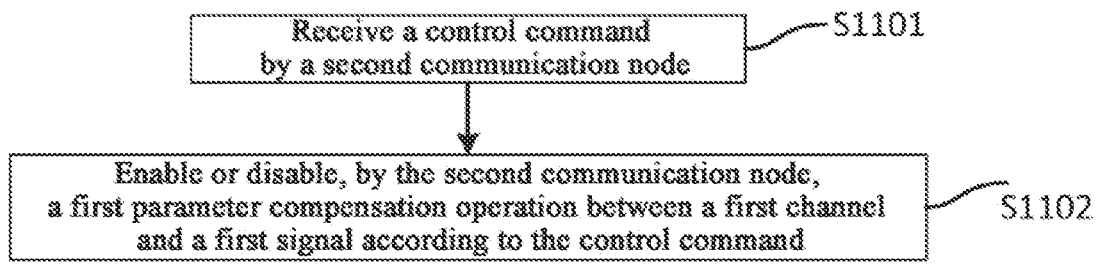
FIG. 11 is a flowchart of an information indication method according to an embodiment of the present disclosure.

FIG. 11 shows a flowchart of an information indication method according to an embodiment of the present application. As shown in FIG. 4, the method may include the following steps.

At S1101, a second communication node receives a control command.

Exemplarily, the second communication node may be a terminal, a user equipment, etc. This control command may be a command transmitted by a first communication node (e.g., a base station or other network devices). The control command may carry control information, or carry control information and pre-compensation parameter information. The control information is used to indicate whether the first communication node performs pre-compensation for a first parameter of a PDCCH, a PDSCH and a CSI-RS according to the configured first parameter compensation operation, and the pre-compensation parameter information is used to indicate the first parameter.

Optionally, the control command may include at least one of an MAC CE, a PDCCH DCI and an RRC message. The first parameter may include at least one of a Doppler shift, an average delay, a Doppler spread, a delay spread and a spatial Rx parameter.

At S1102, the second communication node enables or disables a first parameter compensation operation between a first channel and a first signal according to the control command.

Exemplarily, the first channel may include the PDCCH and/or the PDSCH; and the first signal includes an SS/PBCH and/or a TRS.

That is, upon acquiring the control command, the second communication node enables or disables the first parameter compensation operation between the first channel and the first signal according to the specific indication in the control command.

The embodiments of the present application provide an information indication method, wherein the second communication node receives a control command, and enables or disables the first parameter compensation operation between the first channel and the first signal according to the control command. In an example, in a case where the control command includes an MAC CE, one MAC CE may be specific to the operation of the PDCCH of a specific control resource set (CORESET) of a specific serving cell and the PDSCH QCL of a specific bandwidth part (BWP) of the second communication node. Or one MAC CE may be specific to the operation of the PDCCH QCL of a specific CORESET of a specific serving cell of the second communication node. Or one MAC CE may be specific to the operation of a PDSCH QCL of a specific BWP of a specific serving cell of the second communication node. Or one MAC CE may be specific to the operation of the PDCCH QCL of all CORESETs of a specific serving cell of the second communication node. Or one MAC CE may be specific to the operation of the PDSCH QCL of all BWPs of a specific serving cell of the second communication node. Or one MAC CE may be specific to the operation of the PDCCH QCL of all CORESETs of all serving cells of the second communication node. Or one MAC CE may be specific to the operation of the PDSCH QCL of all BWPs of all serving cells of the second communication node. Or one MAC CE may be specific to the operation of QCL of PDCCHs of all CORESETs and PDSCHs of all BWPs of all serving cells of the second communication node.

In an example, in a case where the control command includes a PDCCH DCI, one PDCCH DCI signaling may be specific to the operation of the PDSCH QCL of a specific BWP of a specific serving cell of the second communication node.

In an example, the specific implementation of S1102 may be that: the second communication node enables or disables the first parameter compensation operation between the first channel and the first signal according to the control information and a predefined parameter, the predefined parameter being the first parameter carried in the control information.

Or, the second communication node enables or disables the first parameter compensation operation between the first channel and the first signal according to the control information and the pre-compensation parameter information.

Further, in a case where the control command carries the control information and the predefined parameter, if the second communication node determines according to the control command that the first communication node does not pre-compensate for the first parameter of at least one of the PDCCH, the PDSCH and the CSI-RS, the second communication node enables the first parameter compensation operation between the first channel and the first signal.

Or, if the second communication node determines according to the control information that the first communication node performs pre-compensation for the first parameter of at least one of the PDCCH, the PDSCH and the CSI-RS, the second communication node disables the first parameter compensation operation between the first channel and the first signal.

In a case where the control command carries the control information and the pre-compensation parameter information, if the second communication node determines according to the control command that the first communication node does not pre-compensate for the first parameter of at least one of the PDCCH, the PDSCH and the CSI-RS, the second communication node enables the first parameter compensation operation between the first channel and the first signal according to the pre-compensation parameter information.

Or, if the second communication node determines according to the control information that the first communication node performs pre-compensation for the first parameter of at least one of the PDCCH, the PDSCH and the CSI-RS, the second communication node disables the first parameter compensation operation between the first channel and the first signal according to the pre-compensation parameter information.

Further, in a case where the second communication node enables the first parameter compensation operation between the first channel and the first signal, the second communication node compensates for the first parameter of at least one of the PDCCH, the PDSCH and the CSI-RS.

Or, in a case where the second communication node disables the first parameter compensation operation between the first channel and the first signal, the second communication node does not compensate for the first parameter of at least one of the PDCCH, the PDSCH and the CSI-RS.

That is, the second communication node receives the control information transmitted by the first communication node, and the control information may indicate whether the first communication node performs pre-compensation for the first parameter of at least one of the PDCCH, the PDSCH and the CSI-RS according to the configured QCL relationship. If the control information indicates that the first communication node does not pre-compensate for the first parameter of at least one of the PDCCH, the PDSCH and the CSI-RS, the second communication node enables the first parameter compensation operation between the first channel and the first signal. That is, the second communication node compensates for the first parameter of at least one of the PDCCH, the PDSCH and the CSI-RS. If the control information indicates that the first communication node performs pre-compensation for the first parameter of at least one of the PDCCH, the PDSCH and the CSI-RS, the second communication node disables the first parameter compensation operation between the first channel and the first signal. That is, the second communication node does not perform a compensation operation on the first parameter of at least one of the PDCCH, the PDSCH and the CSI-RS.

In an example, the second communication node doing not perform the compensation operation on the first parameter may include: the second communication node not performing the compensation operation according to the first signal, but performing the compensation operation according to a demodulation reference signal (DMRS) of the second communication node.

Thus, by carrying the related indication content in the control information, upon receiving the control information, the second communication node can perform or not perform the subsequent compensation operation according the specific indication in the control information.

Figure 12:
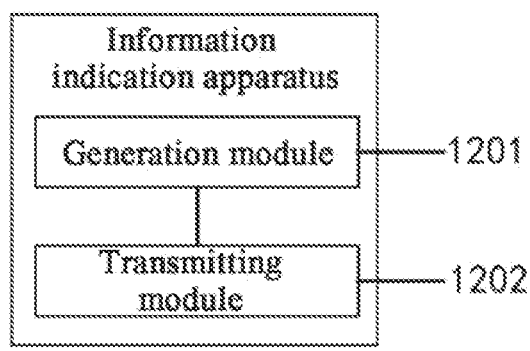
FIG. 12 is a schematic structure diagram of an information indication apparatus according to an embodiment of the present disclosure.

FIG. 12 is an information indication apparatus according to an embodiment of the present application. As shown in FIG. 12, the apparatus includes: a generation module 1201 and a transmitting module 1202.

The generation module is configured to generate a control command.

The transmitting module is configured to transmit the control command to a second communication node.

The second communication node may be a terminal, a user equipment, etc. The control command may carry control information, or may carry control information and pre-compensation parameter information. The control information may be used to indicate whether the apparatus performs pre-compensation for a first parameter of at least one of a PDCCH, a PDSCH and a CSI-RS according to a configured QCL relationship, and the pre-compensation parameter information is used to indicate the first parameter.

The control command may include at least one of an MAC CE, a PDCCH DCI and an RRC message, and the first parameter may include at least one of a Doppler shift, an average delay, a Doppler spread, a delay spread and a spatial Rx parameter.

In an example, the MAC CE is used to indicate whether the apparatus performs pre-compensation for the first parameter, and indicate the second communication node to enable or disable a first parameter compensation operation between a first channel and a first signal.

Optionally, the MAC CE may be identified by an MAC sub-header of a logical channel identifier.

In an example, the MAC CE includes one or more 1-bit first parameter pre-compensation indication domains, the first parameter pre-compensation indication domain is used to indicate that the first communication node does not pre-compensate for the first parameter and indicate the second communication node to enable the first parameter compensation operation between the first channel and the first signal. Or the first parameter pre-compensation indication domain is used to indicate that the first communication node performs pre-compensation for the first parameter and indicate the second communication node to disable the first parameter compensation operation between the first channel and the first signal.

In an example, the PDCCH DCI is a 1-bit first parameter pre-compensation indication field, the first parameter pre-compensation indication field is used to indicate that the apparatus does not pre-compensate for the first parameter and indicate the second communication node to enable the first parameter compensation operation between the first channel and the first signal. Or the first parameter pre-compensation indication field is used to indicate that the apparatus performs pre-compensation for the first parameter and indicate the second communication node to disable the first parameter compensation operation between the first channel and the first signal.

In an example, the RRC message is used to that the apparatus does not pre-compensate for the first parameter and indicate the second communication node to enable the first parameter compensation operation between the first channel and the first signal, or the RRC message is used to indicate that the apparatus performs pre-compensation for the first parameter and indicate the second communication node to disable the first parameter compensation operation between the first channel and the first signal.

Optionally, the first channel may include the PDCCH and/or the PDSCH; and the first signal includes the SS/PBCH and/or the TRS.

In an example, the 1 bit for indicating the second communication node to disable or enable the first parameter between the first channel and the first signal is a separate 1-bit command field or the reused DCI field.

The information indication apparatus provided in this embodiment is used to implement the information indication method in the embodiment shown in FIG. 4, and their implementation principles and technical effects are similar and will not be repeated here.

Figure 13:
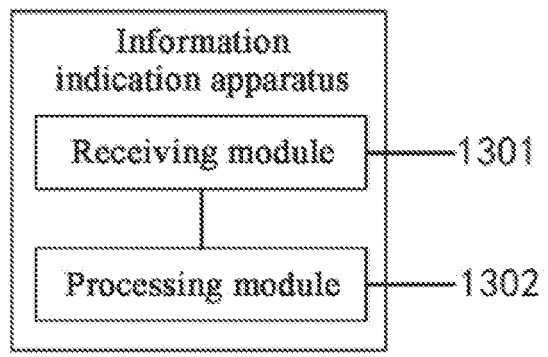
FIG. 13 is a schematic structure diagram of an information indication apparatus according to an embodiment of the present disclosure.

FIG. 13 is an information indication apparatus according to an embodiment of the present application. As shown in FIG. 13, the apparatus includes: a receiving module 1301 and a processing module 1302.

The receiving module is configured to receive a control command.

The processing module is configured to enable or disable a first parameter compensation operation between a first channel and a first signal according to the control command.

The control command carries control information, or carries control information and pre-compensation parameter information. The control information is used to indicate whether the first communication node performs pre-compensation for a first parameter of at least one of a PDCCH, a PDSCH and a CSI-RS according to a configured QCL relationship, the first parameter includes at least one of a Doppler shift, a Doppler spread, a delay spread, an average delay and a spatial Rx parameter, and the pre-compensation parameter information is used to indicate the first parameter.

Optionally, the first channel may include the PDCCH and/or the PDSCH; and the first signal includes an SS/PBCH and/or a TRS.

In an example, the control command includes at least one of an MAC CE, a PDCCH DCI and an RRC message.

In an example, the processing module may be configured to: enable or disable the first parameter compensation operation between the first channel and the first signal according to the control information and a predefined parameter, the predefined parameter being the first parameter carried in the control information; or, enable or disable the first parameter compensation operation between the first channel and the first signal according to the control information and the pre-compensation parameter information.

In an example, the apparatus may further include a determination module.

If the determination module determines according to the control information that the first communication node does not pre-compensate for the first parameter of at least one of the PDCCH, the PDSCH and the CSI-RS, the processing module enables the first parameter compensation operation between the first channel and the first signal.

If the determination module determines according to the control information that the first communication node performs pre-compensation for the first parameter of at least one of the PDCCH, the PDSCH and the CSI-RS, the processing module disables the first parameter compensation operation between the first channel and the first signal.

In an example, in a case where the processing module enables the first parameter compensation operation between the first channel and the first signal, the processing module is further configured to compensate for the first parameter of at least one of the PDCCH, the PDSCH and the CSI-RS.

In an example, in a case where the processing module disables the first parameter compensation operation between the first channel and the first signal, the processing module is further configured not to perform a compensation operation on the first parameter of at least one of the PDCCH, the PDSCH and the CSI-RS.

The information indication apparatus provided in this embodiment is used to implement the information indication method in the embodiment shown in FIG. 11, and their implementation principles and technical effects are similar and will not be repeated here.

Figure 14:
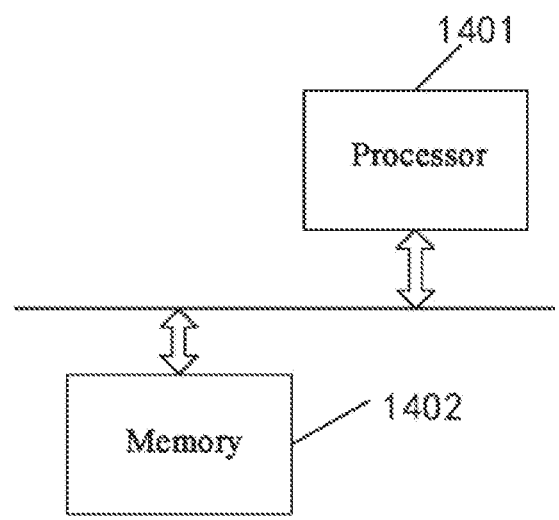
FIG. 14 is a schematic structure diagram of a communication node according to an embodiment of the present application.

FIG. 14 is a schematic structure diagram of a node according to an embodiment. As shown in FIG. 14, the node includes a processor 1401 and a memory 1402. The number of the processor 1401 in the node may be one or more. FIG. 14 is illustrated by taking one processor 1401 as an example. The processor 1401 and the memory 1402 in the node may be connected via a bus or in other ways. FIG. 14 is illustrated by taking the processor and the memory being connected via the bus as an example.

As a computer-readable storage medium, the memory 1402 may be configured to store software programs, computer-executable programs and modules, for example, program instructions/modules corresponding to the information indication method in the embodiments of FIG. 4 and FIG. 11 in the present application (for example, the receiving module 1301 and the processing module 1302 in the information indication apparatus). The processor 1401 implements the information indication method described above by running the software programs, instructions and modules stored in the memory 1402.

The memory 1402 may mainly include a program storage region and a data storage region. The program storage region may store application programs required by the operating system and at least one function. The data storage region may store data created according to the use of the set top box. In addition, the memory 1402 may include high-speed random access memories, or may include non-volatile memories, such as at least one magnetic disk memory device, flash memory devices or other non-volatile solid-state memory devices.

In an example, where possible, the processor in the node may also implement the information indication method described above through the internal logical circuit, gate circuit or other hardware circuits.

An embodiment of the present application further provides a readable and writable storage medium for computer storage, wherein the storage medium stores one or more programs that can be executed by one or more processors to perform an information indication method.

It should be understood by a person of ordinary skill in the art that, all or some of the steps in the methods described above and the functional modules/units in the communication nodes described above may be implemented as software, firmware, hardware and proper combinations thereof.

In the hardware implementation, the division of the functional modules/units mentioned above does not necessarily correspond to the division of physical components. For example, one physical component may have a plurality of functions, or one function or step may be cooperatively executed by a number of physical components. Some or all of the physical components may be implemented as software executed by processors such as central processors, digital signal processors or microprocessors, or implemented as hardware, or implemented as integrated circuits such as application-specific integrated circuits. Such software may be distributed on computer-readable mediums, and the computer-readable mediums may include computer storage mediums (or non-temporary medFsiums) and communication mediums (or temporary mediums). As well-known to a person of ordinary skill in the art, the term computer storage medium includes volatile or non-volatile and removable or non-removable mediums implemented in any method or technology used to store information (such as computer-readable instructions, data structures, program modules or other data). The computer storage medium may include, but not limited to, RAMs, ROMs, EEPROMs, flash memories and other memory technologies, CD-RMs, digital versatile disks (DVDs) or other optical disk storages, magnetic cassettes, magnetic tapes, magnetic disk storages or other magnetic storage devices, or any other mediums that can be used to store desired information and can be accessed by computers. In addition, as well-known to a person of ordinary skill in the art, the communication mediums generally contain computer-readable instructions, data structures, program modules or other data in modulated data signals such as carriers or other transmission mechanisms, and may include any information transfer medium.

We claim:

1. An information indication method, comprising:
generating a control command by a first communication node; and
transmitting, by the first communication node, the control command to a second communication node;
wherein the control command carries control information, the control information is used to indicate whether the first communication node performs pre-compensation for a first parameter of at least one of a physical downlink control channel (PDCCH), a physical downlink shared channel (PDSCH) or a channel state information reference signal (CSI-RS) according to a configured quasi co-location (QCL) relationship.

2. The method of claim 1, wherein the control command comprises at least one of a media access control control element (MAC CE), a physical downlink control channel downlink control indicator (PDCCH DCI) or a radio resource control (RRC) message.

3. The method of claim 1, wherein the first parameter comprises at least one of a Doppler shift, an average delay, a Doppler spread, a delay spread or a spatial reception parameter.

4. The method of claim 2, wherein the MAC CE is used to indicate whether the first communication node performs pre-compensation for the first parameter and indicate the second communication node to enable or disable a first parameter compensation operation between a first channel and a first signal.

5. The method of claim 4, wherein the MAC CE comprises one or more 1-bit first parameter pre-compensation indication domains, the first parameter pre-compensation indication domain is used to indicate that the first communication node does not pre-compensate for the first parameter and indicate the second communication node to enable the first parameter compensation operation between the first channel and the first signal, or the first parameter pre-compensation indication domain is used to indicate that the first communication node performs pre-compensation for the first parameter and indicate the second communication node to disable the first parameter compensation operation between the first channel and the first signal.

6. The method of claim 2, wherein the PDCCH DCI is a 1-bit first parameter pre-compensation indication field, the first parameter pre-compensation indication field is used to indicate that the first communication node does not pre-compensate for the first parameter and indicate the second communication node to enable a first parameter compensation operation between the first channel and the first signal, or the first parameter pre-compensation indication field is used to indicate that the first communication node performs pre-compensation for the first parameter and indicate the second communication node to disable the first parameter compensation operation between the first channel and the first signal.

7. The method of claim 2, wherein the RRC message is used to indicate that the first communication node does not pre-compensate for the first parameter and indicate the second communication node to enable a first parameter compensation operation between the first channel and the first signal, or the RRC message is used to indicate that the first communication node performs pre-compensation for the first parameter and indicate the second communication node to disable the first parameter compensation operation between the first channel and the first signal.

8. The method of claim 5, wherein the first channel comprises at least one of: a PDCCH, or a PDSCH; and
the first signal comprises at least one of: a synchronization signal and a physical broadcast channel, or a tracking reference signal.

9. The method of claim 5, wherein 1 bit for indicating the second communication node to disable or enable the first parameter between the first channel and the first signal is a separate 1-bit command field or a reused DCI field.

10. An information indication method, comprising:
receiving a control command by a second communication node; and
enabling or disabling, by the second communication node, a first parameter compensation operation between a first channel and a first signal according to the control command;
wherein the control command carries control information, or the control command carries control information and pre-compensation parameter information, the control information is used to indicate whether the first communication node performs pre-compensation for a first parameter of at least one of a physical downlink control channel (PDCCH), a physical downlink shared channel (PDSCH) or a channel state information reference signal (CSI-RS) according to a configured quasi co-location (QCL) relationship, and the pre-compensation parameter information is used to indicate the first parameter.

11. The method of claim 10, wherein the control command comprises at least one of: a media access control control element (MAC CE), a physical downlink control channel downlink control indicator (PDCCH DCI) or a radio resource control (RRC) message.

12. The method of claim 10, wherein the enabling or disabling, by the second communication node, a first parameter compensation operation between a first channel and a first signal according to the control command comprises:
enabling or disabling, by the second communication node, the first parameter compensation operation between the first channel and the first signal according to the control information and a predefined parameter, the predefined parameter being the first parameter carried in the control information.

13. The method of claim 12, wherein the enabling or disabling, by the second communication node, the first parameter compensation operation between the first channel and the first signal according to the control information comprises:
in response to the second communication node determining according to the control information that the first communication node does not pre-compensate for the first parameter of at least one of the PDCCH, the PDSCH or the CSI-RS, enabling, by the second communication node, the first parameter compensation operation between the first channel and the first signal;
or, in response to the second communication node determining according to the control information that the first communication node performs pre-compensation for the first parameter of at least one of the PDCCH, the PDSCH or the CSI-RS, disabling, by the second communication node, the first parameter compensation operation between the first channel and the first signal.

14. The method of claim 12, wherein the enabling or disabling, by the second communication node, the first parameter compensation operation between the first channel and the first signal according to the control information comprises:
in response to the second communication node determining according to the control information that the first communication node does not pre-compensate for the first parameter of at least one of the PDCCH, the PDSCH or the CSI-RS, enabling, by the second communication node, the first parameter compensation operation between the first channel and the first signal;
or, in response to the second communication node determining according to the control information that the first communication node performs pre-compensation for the first parameter of at least one of the PDCCH, the PDSCH or the CSI-RS, disabling, by the second communication node, the first parameter compensation operation between the first channel and the first signal.

15. The method of claim 10, wherein the first parameter comprises at least one of: a Doppler shift, a Doppler spread, a delay spread, an average delay, or a spatial reception parameter.

16. The method of claim 15, wherein the first channel comprises at least one of a PDCCH or a PDSCH; and
the first signal comprises at least one of: a synchronization signal and a physical broadcast channel, or a tracking reference signal.

17. The method of claim 12, wherein, in response to the second communication node enabling the first parameter compensation operation between the first channel and the first signal, the second communication node compensates for the first parameter of at least one of the PDCCH, the PDSCH and the CSI-RS.

18. The method of claim 12, wherein, in response to the second communication node disabling the first parameter compensation operation between the first channel and the first signal, the second communication node does not compensate for the first parameter of at least one of the PDCCH, the PDSCH and the CSI-RS.

19. A node, comprising: a processor, programs being used by the processor to implement an information indication method, comprising:
generating a control command by a first communication node; and
transmitting, by the first communication node, the control command to a second communication node;
wherein the control command carries control information, the control information is used to indicate whether the first communication node performs pre-compensation for a first parameter of at least one of a physical downlink control channel (PDCCH), a physical downlink shared channel (PDSCH) or a channel state information reference signal (CSI-RS) according to a configured quasi co-location (QCL) relationship.

20. A node, comprising: a processor, programs being used by the processor to implement the information indication method of claim 10.

* * * * *